(12) United States Patent
Mungi et al.

(10) Patent No.: US 10,133,732 B2
(45) Date of Patent: Nov. 20, 2018

(54) INTERACTIVE LOCATION SENSITIVE NETWORK RESPONSE

(71) Applicant: INTERNATIONAL BUSINESS MACHINES CORPORATION, Armonk, NY (US)

(72) Inventors: Ashish Mungi, Bangalore (IN); Joy Mustafi, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 57 days.

(21) Appl. No.: 15/464,957

(22) Filed: Mar. 21, 2017

(65) Prior Publication Data
US 2018/0276198 A1    Sep. 27, 2018

(51) Int. Cl.
*G06F 17/27* (2006.01)
*G06F 17/11* (2006.01)
*G06F 17/30* (2006.01)

(52) U.S. Cl.
CPC ........ *G06F 17/2785* (2013.01); *G06F 17/271* (2013.01); *G06F 17/274* (2013.01); *G06F 17/278* (2013.01); *G06F 17/2735* (2013.01); *G06F 17/11* (2013.01); *G06F 17/3087* (2013.01)

(58) Field of Classification Search
CPC .................................................. G06F 17/3087
See application file for complete search history.

(56) References Cited

U.S. PATENT DOCUMENTS

| | | | | |
|---|---|---|---|---|
| 7,672,931 B2 * | 3/2010 | Hurst-Hiller | ..... | G06F 17/30654 707/999.003 |
| 7,774,348 B2 * | 8/2010 | Delli Santi | ......... | G06F 17/3087 707/708 |
| 7,966,304 B2 * | 6/2011 | Bennett | ............... | G06F 17/3087 707/706 |
| 8,612,478 B1 * | 12/2013 | Duong | ................ | G06F 17/3087 434/322 |
| 9,495,355 B2 * | 11/2016 | Mungi | .................. | G06F 17/271 |
| 9,514,185 B2 * | 12/2016 | Mungi | ................ | G06F 17/2705 |
| 2005/0065916 A1 * | 3/2005 | Ge | ........ | G06F 17/3087 |
| 2007/0198495 A1 * | 8/2007 | Buron | ................ | G06F 17/3087 |
| 2008/0154888 A1 * | 6/2008 | Buron | ............... | G06F 17/30241 |
| 2008/0172357 A1 * | 7/2008 | Rechis | ................ | G06F 17/3087 |
| 2010/0161311 A1 | 6/2010 | Massuh | | |
| 2013/0132590 A1 | 5/2013 | Levenshteyn et al. | | |
| 2015/0178392 A1 | 6/2015 | Jockisch et al. | | |

* cited by examiner

*Primary Examiner* — Forrest F Tzeng
(74) *Attorney, Agent, or Firm* — Schmeiser, Olsen & Watts; Brian Restauro

(57) ABSTRACT

A method and system for improving location specific (L) functions is provided. The method includes generating and maintaining an online L-word dictionary. Location specific attributes, settings, and preferences associated with a current location of a mobile device and a user are retrieved. An input question is received and an NLP analysis with respect to the input question is executed to extract a required value phrase. An interim question based on an extracted required value phrase is formed and an answer to the input question is determined in natural language based on a solved interim question. The answer is narrated in natural language and includes an automated interactive response from a hardware device in real time.

20 Claims, 13 Drawing Sheets

| NO | STEP IN FLOWCHART #1 | EXAMPLE QUESTION #1 | EXAMPLE QUESTION #2 | EXAMPLE QUESTION #3 | EXAMPLE QUESTION #4 | EXAMPLE QUESTION #5 |
|---|---|---|---|---|---|---|
| 1 | GET THE USER'S CURRENT LOCATION | US | US | INDIA | INDIA | ITALY |
| 2 | GET THE USER'S LOCATION SETTINGS | CURRENCY = US DOLLAR MEASUREMENT = US UNITS | CURRENCY = US DOLLAR MEASUREMENT = US UNITS | CURRENCY = INDIAN RUPEE MEASUREMENT = METRIC | CURRENCY = INDIAN RUPEE MEASUREMENT = METRIC | CURRENCY = EURO MEASUREMENT = METRIC |
| 3 | GET THE USER'S LOCATION-SPECIFIC PREFERENCES | LOCALIZE ANSWER = NO | LOCALIZE ANSWER = YES | LOCALIZE ANSWER = YES | LOCALIZE ANSWER = NO | LOCALIZE ANSWER = YES |
| 4 | GET THE INPUT QUESTION CONTAINING LOCATION-SENSITIVE WORDS OR PHRASES IN NATURAL LANGUAGE (FROM A DATA SOURCE OR USER INTERFACE) | WHAT IS THE GAS PRICE IN BANGALORE, INDIA? | WHAT IS THE GAS PRICE IN BANGALORE, INDIA? | WHAT IS THE GAS PRICE IN MUMBAI, INDIA? | WHAT IS THE PETROL PRICE IN BANGALORE, INDIA? | WHO DISCOVERED THE GENERAL THEORY OF RELATIVITY? |
| 5 | IDENTIFY ALL THE LOCATION-SENSITIVE WORDS OR PHRASES (OUR PROPOSED CONCEPT OF "L-WORDS") IN THE INPUT QUESTION | GAS PRICE, BANGALORE, INDIA | GAS PRICE, BANGALORE, INDIA | GAS PRICE, MUMBAI, INDIA | PETROL PRICE, BANGALORE, INDIA | <NONE> |
| 6 | L-WORDS > 0? | YES | YES | YES | YES | NO |
| 7 | EXTRACT THE REQUIRED VALUE PHRASE (SUCH AS "GAS PRICE") IN THE INPUT QUESTION | GAS PRICE IN BANGALORE, INDIA | GAS PRICE IN BANGALORE, INDIA | GAS PRICE IN MUMBAI, INDIA | PETROL PRICE INT BANGALORE, INDIA | <NOT APPLICABLE> |

FIG. 5A

| NO | STEP IN FLOWCHART #1 | EXAMPLE QUESTION #1 | EXAMPLE QUESTION #2 | EXAMPLE QUESTION #3 | EXAMPLE QUESTION #4 | EXAMPLE QUESTION #5 |
|---|---|---|---|---|---|---|
| 8 | GET THE LIST OF ALL LOCATION CONVERSION LOOKUP PHRASES FROM THE PROPOSED L-WORD DICTIONARY | US, GAS = US, GASOLINE US, GASOLINE = INDIA, PETROL PRICE = CURRENCY US, PRICE = US, DOLLARS INDIA, PRICE = INDIA, RUPEES US, MEASURE = US GALLON INDIA, MEASURE = INDIA LITRE | US, GAS = US, GASOLINE US, GASOLINE = INDIA, PETROL PRICE = CURRENCY US, PRICE = US, DOLLARS INDIA, PRICE = INDIA, RUPEES US, MEASURE = US GALLON INDIA, MEASURE = INDIA LITRE | INDIA, GAS = INDIA, NATURAL GAS INDIA, NATURAL GAS = INDIA, LIQUEFIED NATURAL GAS PRICE = CURRENCY INDIA, PRICE = INDIA, RUPEES INDIA, MEASURE = INDIA, CYLINDER | PRICE = CURRENCY INDIA, PRICE = INDIA, RUPEES INDIA, MEASURE = INDIA LITRE | <NOT APPLICABLE> |
| 9 | ANALYZE THE INPUT QUESTION AND DETERMINE THE LIST OF RELEVANT LOOKUP PHRASES / RELEVANT VARIABLES | PETROL PRICE PER LITRE IN BANGALORE, INDIA | PETROL PRICE PER LITRE IN BANGALORE, INDIA | LIQUEFIED NATURAL GAS PRICE PER CYLINDER IN MUMBAI, INDIA | PETROL PRICE PER LITRE IN BANGALORE, INDIA | <NOT APPLICABLE> |
| 10 | FORM MATHEMATICAL EQUATION(S) TO BE SOLVED TO ANSWER THE REQUIRED VALUE PHRASE [LOOKUP CURRENT VALUES IF REQUIRED] | 1 US GALLON = 3.78541 LITRE 1 US DOLLAR = 65 INDIAN RUPEES | 1 US GALLON = 3.78541 LITRE 1 US DOLLAR = 65 INDIAN RUPEES | 1 CYLINDER = 14.2 kg | <NOT APPLICABLE> | <NOT APPLICABLE> |
| 11 | FORM INTERIM QUESTIONS FOR DETERMINING VALUE OF EACH RELEVANT VARIABLE | WHAT IS THE PETROL PRICE PER LITRE IN BANGALORE, INDIA? | WHAT IS THE PETROL PRICE PER LITRE IN BANGALORE, INDIA? | WHAT IS THE LIQUEFIED NATURAL GAS PRICE PER CYLINDER IN MUMBAI, INDIA? | WHAT IS THE PETROL PRICE PER LITRE IN BANGALORE, INDIA? | <NOT APPLICABLE> |

FIG. 5B

| NO | STEP IN FLOWCHART #1 | EXAMPLE QUESTION #1 | EXAMPLE QUESTION #2 | EXAMPLE QUESTION #3 | EXAMPLE QUESTION #4 | EXAMPLE QUESTION #5 |
|----|---|---|---|---|---|---|
| 12 | DETERMINE THE CURRENT VALUE OF EACH RELEVANT VARIABLE Rx BY GETTING AN ANSWER FOR EACH INTERIM QUESTION | PETROL PRICE PER LITRE IN BANGALORE, INDIA = INR 61.94 PER LITRE (ON 30-MARCH-2016) | PETROL PRICE PER LITRE IN BANGALORE, INDIA = INR 61.94 PER LITRE (ON 30-MARCH-2016) | LIQUEFIED NATURAL GAS PRICE PER CYLINDER IN MUMBAI, INDIA = INR 522.50 (NON-SUBSIDISED) | PETROL PRICE PER LITRE IN BANGALORE, INDIA = INR 61.94 PER LITRE (ON 30-MARCH-2016) | <NOT APPLICABLE> |
| 13 | ANY INTERIM QUESTION UNANSWERED? | NO | NO | YES | NO | <NOT APPLICABLE> |
| 14 | REPHRASE UNANSWERED INTERIM QUESTIONS BY SUBSTITUTING VALUES OF KNOWN RELEVANT VARIABLE(S) INTO THE EQUATIONS | <NOT APPLICABLE> | <NOT APPLICABLE> | WHAT IS THE WEIGHT OF A GAS CYLINDER? | <NOT APPLICABLE> | <NOT APPLICABLE> |
| 15 | DETERMINE THE CURRENT VALUE OF EACH RELEVANT VARIABLE Rx BY GETTING AN ANSWER FOR EACH INTERIM QUESTION | <NOT APPLICABLE> | <NOT APPLICABLE> | 1 CYLINDER = 14.2 kg | <NOT APPLICABLE> | <NOT APPLICABLE> |
| 16 | ANY INTERIM QUESTION UNANSWERED? | <NOT APPLICABLE> | <NOT APPLICABLE> | NO | <NOT APPLICABLE> | <NOT APPLICABLE> |

FIG. 5C

| NO | STEP IN FLOWCHART #1 | EXAMPLE QUESTION #1 | EXAMPLE QUESTION #2 | EXAMPLE QUESTION #3 | EXAMPLE QUESTION #4 | EXAMPLE QUESTION #5 |
|---|---|---|---|---|---|---|
| 17 | SOLVE THE SET OF EQUATIONS TO GET THE ANSWER FOR THE "REQUIRED VALUE PHRASE" | INR 61.94 PER LITRE (ON 30-MARCH-2016) (SINCE LOCALIZE ANSWER = NO FOR THIS USER) | INR 61.94 PER LITRE (ON 30-MARCH-2016) = USD 0.9529 PER LITRE = USD 3.61 PER GALLON (SINCE LOCALIZE ANSWER = YES FOR THIS USER) | INR 522.50 PER CYLINDER (14.2 kg) (NON-SUBSIDISED) | INR 61.94 PER LITRE (ON 30-MARCH-2016) (SINCE LOCALIZE ANSWER = NO FOR THIS USER) | <NOT APPLICABLE> |
| 18 | NARRATE THE ANSWER IN NATURAL LANGUAGE | THE GAS PRICE IN BANGALORE, INDIA IS INR 61.94 PER LITRE (ON 30-MARCH-2016) | THE GAS PRICE IN BANGALORE, INDIA IS INR 3.61 PER GALLON (ON 30-MARCH-2016) | THE GAS PRICE IN MUMBAI, INDIA IS INR 522.50 PER CYLINDER (14.2 kg) (NON-SUBSIDISED) (AS OF 30-MARCH-2016) | THE PETROL PRICE IN BANGALORE, INDIA IS INR 61.94 PER LITRE (ON 30-MARCH-2016) | ALBERT EINSTEIN |

FIG. 5D

INTERACTIVE LOCATION SENSITIVE NETWORK RESPONSE

FIELD

The present invention relates generally to a method for delivering automated responses via a network and in particular to a method and associated system for improving network response technology by automatically generating a network based answer to an input question comprising a location specific word or phrase using natural language processing NLP.

BACKGROUND

Accurately determining information based on various parameters typically includes an inaccurate process with little flexibility. Determining geographical responses to multiple requests with respect to electronic presentations may include a complicated process that may be time consuming and require a large amount of resources. Accordingly, there exists a need in the art to overcome at least some of the deficiencies and limitations described herein above.

SUMMARY

In one embodiment, the present invention provides an automated method for generating an answer to an input question comprising a location specific (L) word or phrase using natural language processing (NLP), the method comprising: generating and maintaining, by a processor of a hardware device, an online L-word dictionary, wherein the generating and maintaining comprises: determining a relationship between a plurality of L-words and a plurality of corresponding values, wherein the plurality of corresponding values include a plurality of related lookup phrases and a plurality of concept terms; mapping the plurality of L-words to the plurality of corresponding values based on the determined relationship; and storing the mapped plurality of L-words to the plurality of corresponding values in the online L-word Dictionary comprised by a specialized remotely located database computer; retrieving, by the processor via circuitry of a mobile device of a user, location specific attributes associated with a current location of the mobile device and the user; retrieving, by the processor, location specific settings and location specific preferences associated with the user; receiving, by the processor, the input question, wherein the input question is entered by the user via a graphical user interface associated with the mobile device; executing, by the processor, an NLP analysis with respect to the input question to extract a required value phrase; generating, by the processor, at least one mathematical equation based on the extracted required value phrase, wherein the generating the at least one mathematical equation comprises: identifying the location specific word or phrase comprised by the received input question, wherein a value associated with the identified location specific word or phrase varies according to a particular geographical point, and wherein the identifying comprises communicating online with the specialized remotely located database computer to access the online L-word Dictionary; and resolving the identified location specific word or phrase comprised by the received input question, wherein the resolving comprises the communicating online with the specialized remotely located database computer to access the online L-word Dictionary and recursively mapping a plurality of variables associated with location specific word or phrase to at least one formula contained in the L-word Dictionary; forming, by the processor, at least one interim question based on the extracted required value phrase; solving, by the processor executing specialized circuitry, the at least one formed mathematical equation and the at least one formed interim question, wherein the solving comprises prompting the user via the graphical user interface for a plurality of digital input to resolve an ambiguity associated with the at least one formed mathematical equation and the at least one formed interim question; determining, by the processor, the answer to the input question in natural language based on the solved at least one interim question or the solved at least one mathematical equation, wherein the determining the answer comprises the hardware device simultaneously interacting with a specialized on-line question-answer system to simultaneously search: an internet, a plurality of online data repositories, a plurality of online databases, and a plurality of online corpuses according to the value associated with the identified location specific word or phrase associated with the particular geographical point; and narrating, by the processor, the answer to the input question in natural language based on the solved at least one interim question or the solved at least one mathematical equation, wherein the narrated answer comprises an automated interactive response from the hardware device in real time.

In another embodiment, the present invention provides a computer program product, comprising a computer readable hardware storage device storing a computer readable program code, the computer readable program code comprising an algorithm that when executed by a processor of a hardware device implements an automated method for generating an answer to an input question comprising a location specific (L) word or phrase using NLP, the method comprising: generating and maintaining, by the processor, an online L-word dictionary, wherein the generating and maintaining comprises: determining a relationship between a plurality of L-words and a plurality of corresponding values, wherein the plurality of corresponding values include a plurality of related lookup phrases and a plurality of concept terms; mapping the plurality of L-words to the plurality of corresponding values based on the determined relationship; and storing the mapped plurality of L-words to the plurality of corresponding values in the online L-word Dictionary comprised by a specialized remotely located database computer; retrieving, by the processor via circuitry of a mobile device of a user, location specific attributes associated with a current location of the mobile device and the user; retrieving, by the processor, location specific settings and location specific preferences associated with the user; receiving, by the processor, the input question, wherein the input question is entered by the user via a graphical user interface associated with the mobile device; executing, by the processor, an NLP analysis with respect to the input question to extract a required value phrase; generating, by the processor, at least one mathematical equation based on the extracted required value phrase, wherein the generating the at least one mathematical equation comprises: identifying the location specific word or phrase comprised by the received input question, wherein a value associated with the identified location specific word or phrase varies according to a particular geographical point, and wherein the identifying comprises communicating online with the specialized remotely located database computer to access the online L-word Dictionary; and resolving the identified location specific word or phrase comprised by the received input question, wherein the resolving comprises the communicating online with the specialized remotely located database computer to access the online L-word Dictionary and recursively mapping a plurality of variables associated with location specific word or phrase to at least one formula contained in the L-word Dictionary; forming, by the processor, at least one interim question based on the extracted required value phrase; solving, by the processor executing specialized circuitry, the at least one formed mathematical equation and the at least one formed interim question, wherein the solving comprises prompting the user via the graphical user interface for a plurality of digital input to resolve an ambiguity associated with the at least one formed mathematical equation and the at least one formed interim question; determining, by the processor, the answer to the input question in natural language based on the solved at least one interim question or the solved at least one mathematical equation, wherein the determining the answer comprises the hardware device simultaneously interacting with a specialized on-line question-answer system to simultaneously search: an internet, a plurality of online data repositories, a plurality of online databases, and a plurality of online corpuses according to the value associated with the identified location specific word or phrase associated with the particular geographical point; and narrating, by the processor, the answer to the input question in natural language based on the solved at least one interim question or the solved at least one mathematical equation, wherein the narrated answer comprises an automated interactive response from the hardware device in real time.

In another embodiment, the present invention provides a hardware device comprising a processor coupled to a computer-readable memory unit, the memory unit comprising instructions that when executed by the processor implements an automated method for generating an answer to an input question comprising a location specific (L) word or phrase using NLP, the method comprising: generating and maintaining, by a processor of a hardware device, an online L-word dictionary, wherein the generating and maintaining comprises: determining a relationship between a plurality of L-words and a plurality of corresponding values, wherein the plurality of corresponding values include a plurality of related lookup phrases and a plurality of concept terms; mapping the plurality of L-words to the plurality of corresponding values based on the determined relationship; and storing the mapped plurality of L-Words to the plurality of corresponding values in the online L-word Dictionary comprised by a specialized remotely located database computer; retrieving, by the processor via circuitry of a mobile device of a user, location specific attributes associated with a current location of the mobile device and the user; retrieving, by the processor, location specific settings and location specific preferences associated with the user; receiving, by the processor, the input question, wherein the input question is entered by the user via a graphical user interface associated with the mobile device; executing, by the processor, an NLP analysis with respect to the input question to extract a required value phrase; generating, by the processor, at least one mathematical equation based on the extracted required value phrase, wherein the generating the at least one mathematical equation comprises: identifying the location specific word or phrase comprised by the received input question, wherein a value associated with the identified location specific word or phrase varies according to a particular geographical point, and wherein the identifying comprises communicating online with the specialized remotely located database computer to access the online L-word Dictionary; and resolving the identified location specific word or phrase comprised by the received input question, wherein the resolving comprises the communicating online with the specialized remotely located database computer to access the online L-word dictionary and recursively mapping a plurality of variables associated with location specific word or phrase to at least one formula contained in the L-word Dictionary; forming, by the processor, at least one interim question based on the extracted required value phrase; solving, by the processor executing specialized circuitry, the at least one formed mathematical equation and the at least one formed interim question, wherein the solving comprises prompting the user via the graphical user interface for a plurality of digital input to resolve an ambiguity associated with the at least one formed mathematical equation and the at least one formed interim question; determining, by the processor, the answer to the input question in natural language based on the solved at least one interim question or the solved at least one mathematical equation, wherein the determining the answer comprises the hardware device simultaneously interacting with a specialized on-line question-answer system to simultaneously search: an internet, a plurality of online data repositories, a plurality of online databases, and a plurality of online corpuses according to the value associated with the identified location specific word or phrase associated with the particular geographical point; and narrating, by the processor, the answer to the input question in natural language based on the solved at least one interim question or the solved at least one mathematical equation, wherein the narrated answer comprises an automated interactive response from the hardware device in real time.

The present invention advantageously provides a simple method and associated system capable of accurately determining information based on various parameters.

BRIEF DESCRIPTION OF THE DRAWINGS

FIG. 4, including

FIGS. 5A-5D illustrate examples for solving location sensitive questions using the algorithm of FIG. 4, in accordance with embodiments of the present invention.

DETAILED DESCRIPTION

Figure 1:
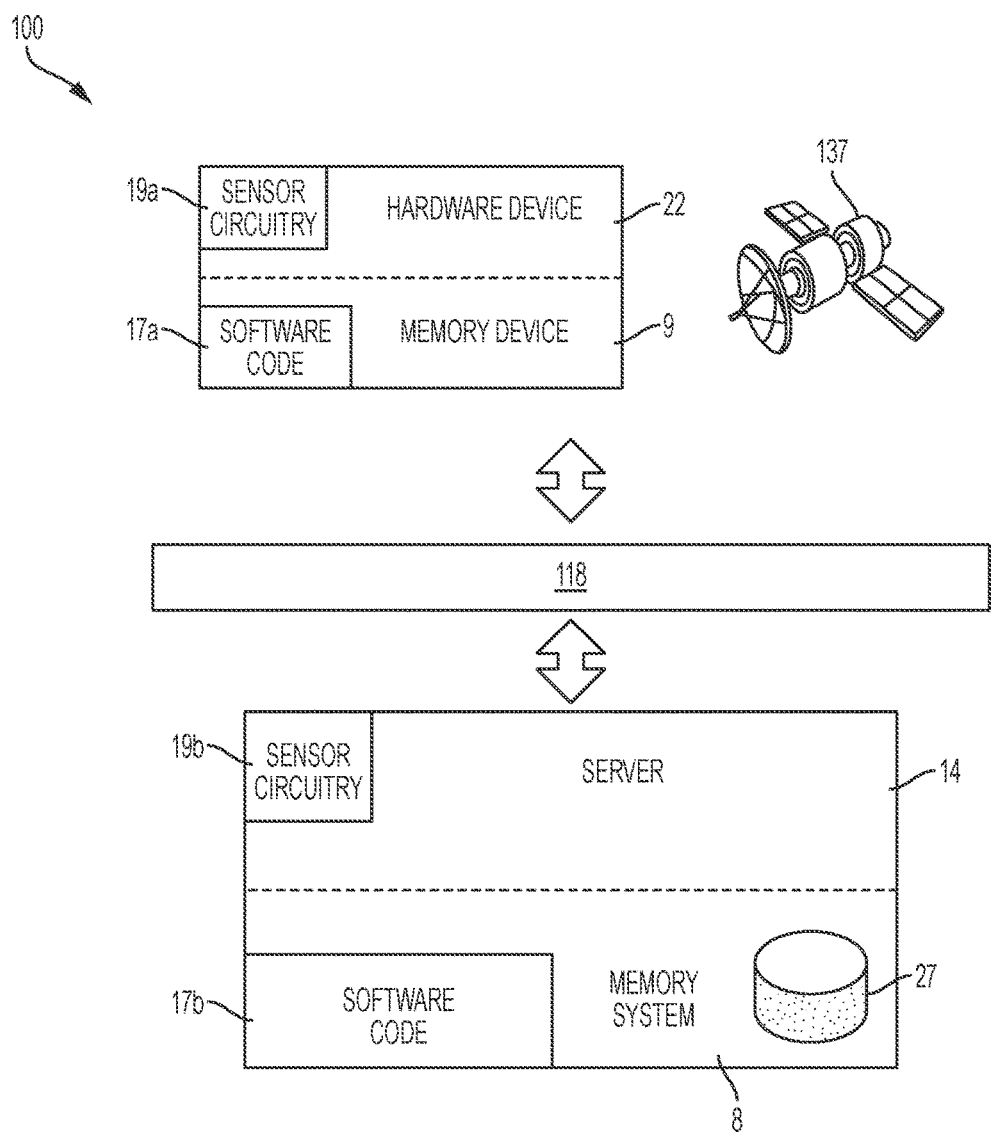
FIG. 1 illustrates a system for generating an answer to an input question comprising location sensitive words or phrases in real time using natural language processing (NLP), in accordance with embodiments of the present invention.

FIG. 1 illustrates a system 100 for generating an answer to an input question comprising location sensitive words or phrases in real time using natural language processing (NLP), in accordance with embodiments of the present invention. Location specific or sensitive (L) words or phrases are defined herein as those whose values vary with location or depend on location. There are several types of questions which contain location sensitive words or phrases which need to be resolved to their current values before the question can be answered. An answer is valid only with respect to a specific location associated with where the question is asked, and it may change over various locations for a same question. Therefore, it may be advantageous, among other things, to automatically answer such location sensitive questions in real-time using natural language processing. Therefore, system 100 allows a user to enter a question containing location sensitive words or phrases in natural language and receive an automatic interactive response or correct answer from hardware device 22 in real-time.

System 100 may understand a question containing location sensitive words or phrases stated in natural language and provide a natural language answer in real-time. System 100 enables a process associated with location (L)-words defined herein as location sensitive words or phrases comprising values depending on and/or varying with location.

Additionally, system 100 may comprise an L-word dictionary 27 (e.g., a database) comprising a list of L-words and associated mapping with respect to related lookup phrases or concept terms. The related concept terms or lookup phrases may be generic or domain specific. Additionally, a current value of the related concept terms or lookup phrases may have to be determined in order to calculate a current value of the L-word. Therefore, a given L-word may be mapped to multiple lookup phrases and a set of the multiple lookup (i.e., relevant lookup phrases) may be required to answer a given question. The L-word dictionary 27 may be created, updated, and/or maintained as a separate entity.

System 100 may enable a question answer system to answer location sensitive questions with respect to L words. Additionally, system 100 may define and use an L-word dictionary comprising a global list of generic or domain-specific location sensitive words or phrases. Various implementations of system 100 may analyze an input question for L-words and determine the list of relevant phrases or relevant variables from L-word dictionary 27. Furthermore, system 100 may iteratively formulate interim questions and equations to look-up, search, determine, or calculate the current values of all the relevant variables as well as obtain the answer to the input question by solving the interim questions or equations in terms of a required value phrase.

Additionally, system 100 may utilize the following technology:
1. Parsing/syntactic analysis comprising a process for analyzing a string of symbols in natural language or computer languages according to the rules of a formal grammar process.
2. Part of speech (POS) tagging (with respect to corpus linguistics) comprising a process for marking up a word in a text corpus as corresponding to a particular part of speech based its definition and context (i.e., a relationship with adjacent and related words in a phrase, sentence, or paragraph).
3. Typed dependency analysis comprising a representation of grammatical relations between words in a sentence such that the words have been designed to be easily understood and effectively used by machines for extracting textual relations. For example, dependencies may comprise triplets such as a name of the relation, governor, and dependent.
4. Phrase chunking comprising a natural language process separating and segmenting a sentence into its sub-constituents, such as a noun, verb, and prepositional phrase.
5. Named entity recognition (NER) comprising a subtask of information extraction seeking to locate and classify atomic elements within text into predefined categories such as names of persons, organizations, locations, expressions of times, quantities, monetary values, percentages, etc.

Furthermore, system 100 may execute software code (e.g., software code 17a or 17b) to answer location sensitive questions hardware device 22 and server 14. The software code may include retrieving an input question comprising location sensitive words or phrases in natural language (from a data source or user interface). The software code may additionally execute a process for identifying all location sensitive words or phrases (L-words) in the input question using L-word dictionary 27. If the input question is not location sensitive and does not contain any L-words (L-words=0), then the software code may terminate the process. If the input question is location sensitive then it may contain L-words (L-words>0) and the software code may continue execution. Therefore, the aforementioned technologies may be executed with respect to natural language processing and an output of the NLP analysis may be stored in a temporary repository or may be held in memory.

According to at least one implementation, a required value phrase is defined herein as a phrase or term within an input question that needs to be answered in order to answer the location sensitive question. The required value phrase in the input question may be extracted and iteratively (for each L-word in the input question), software code may retrieve all associated lookup phrases from the L-word dictionary. The software code analyzes the input question and determines a list of relevant lookup phrases or relevant variables. Furthermore, the software code may form mathematical equation(s) to be solved to answer the required value phrase.

For each relevant variable, system 100 may formulate interim questions for determining a value of a relevant variable and determine a current value of each relevant variable by: asking the interim questions to a question-answer system; searching the Internet or searching a data repository or database; searching a corpus, etc. Additionally, system 100 may iterate if there are any interim question still unanswered, by rephrasing unanswered interim questions after substituting values of known relevant variable(s) into the equation(s), and determining the current value of each remaining relevant variables by: asking the rephrased interim questions to a question-answer system; searching the Internet; searching a data repository or database; searching a corpus, etc. System 100 uses current values of all relevant variables to solve the set of equations to answer the required value phrase and narrate the answer in natural language, in terms of the required value phrase as an answer to the original input question.

System 100 of FIG. 1 includes a hardware device 22 and a satellite system 137 in communication with a server 14 via a network 118. Hardware device 22 and server 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, hardware device 22 and server 14 may each comprise a specialized hardware device(s) comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit such as an application specific integrated circuit (ASIC) designed for only implementing an automated process for generating an answer to an input question comprising location sensitive words or phrases in real time using NLP. Hardware device 22 includes a memory device 9, software code 17a and sensor circuitry 19a (all sensors (e.g., a GPS sensor, etc.), interfaces, and associated control hardware for enabling software 17a to communicate with server 14 and execute a process for generating an answer to an input question comprising location sensitive words or phrases in real time using natural language processing (NLP)). Server 14 includes a memory system 8 (comprising an L-word dictionary 27 comprised by a database), software code 17b and sensor circuitry 19b (all sensors (e.g., a GPS sensor, etc.), interfaces, and associated control hardware for enabling software 17b to communicate with hardware device 22 and execute a process for generating an answer to an input question comprising location sensitive words or phrases in real time using natural language processing (NLP)).

Hardware device 22 is enabled to execute software code 17a (e.g., answering location sensitive questions software code). Server 14 is enabled to execute and control software code 17b (e.g., answering location sensitive questions software code) and network 118. Additionally, system 100 may include a plurality of hardware devices 22 and servers 14, only one of which is shown for illustrative brevity. Network 118 may include various types of communication networks, such as, a wide area network (WAN), local area network (LAN), a telecommunication network, a wireless network, a public switched network and/or a satellite network. Server 14 may also include an L-word dictionary 27 which may contain a set of L-words and their possible corresponding values. According to the present embodiment, L-words may be defined as location sensitive words or phrases whose values depend on and may vary by (geographical) location. L-word dictionary 27 may be created, updated, and maintained as a separate entity.

Hardware device 22 may communicate with server 14 via (communications) network 118. Network 118 may include connections, such as wire, wireless communication links, and/or fiber optic cables. Hardware device 22 may comprise any type of device including, inter alia, a mobile device, a telephone, a personal digital assistant, a netbook, a laptop computer, a tablet computer, a desktop computer, a specialized hardware device (comprising specialized circuitry) or any type of device capable of running a program and accessing a network.

Software code 17a and 17b running on hardware device 22 and server 14 is enabled to solve arithmetic and algebraic problems. For example, a user using software code 17a, running on hardware device 22, may connect via a network 118 to server 14, which may also be running software code 17b. Furthermore, the user using hardware device 22 or server 14 may utilize the software code 17a and 17b to answer location sensitive questions (i.e., location sensitive words or phrases) stated in natural language and to provide a natural language answer in real-time. The aforementioned process is explained in further detail below with respect to FIG. 2.

Figure 2:
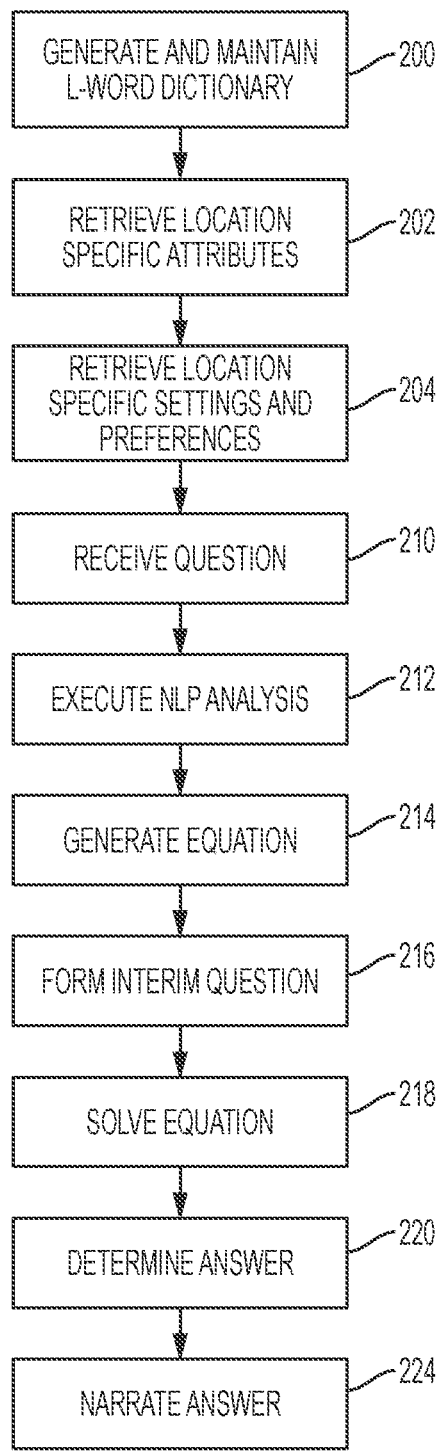
FIG. 2 illustrates an algorithm detailing a process flow enabled by the system of FIG. 1 for generating an answer to an input question comprising location sensitive words or phrases in real time using natural language processing (NLP), in accordance with embodiments of the present invention.

FIG. 2 illustrates an algorithm detailing a process flow enabled by system 100 of FIG. 1 for generating an answer to an input question comprising location sensitive words or phrases in real time using NLP, in accordance with embodiments of the present invention. Each of the steps in the algorithm of FIG. 2 may be enabled and executed in any order by a computer processor(s) or any type of specialized hardware executing computer code. In step 200, a hardware device (e.g., hardware device 14 of FIG. 1) generates and maintains an online location (L)-word dictionary. The aforementioned process may include:

1. Determining a relationship between a plurality of L-words and a plurality of corresponding values. The plurality of corresponding values may include a plurality of related lookup phrases and a plurality of concept terms.
2. Mapping the plurality of L-words to the plurality of corresponding values based on the determined relationship.
3. Storing the mapped plurality of L-words in the online L-word Dictionary comprised by a specialized remotely located database computer.

In step 202, location specific attributes are retrieved (via circuitry of a mobile device, etc.) of a user. The location specific attributes are associated with a current location of the mobile device and the user. In step 204, location specific settings and location specific preferences associated with the user are retrieved. Retrieving the location specific attributes may include:

1. Identifying an IP address of the mobile device.
2. Determining a network in communication with the IP address.
3. Determining the current location based on based on a location of the network.

Alternatively, retrieving the location specific attributes may include:

1. Identifying GPS coordinates of the mobile device.
2. Determining the current location based on based on the GPS coordinates.

In step 210, an input question is received. The input question is entered by the user via a graphical user interface associated with the mobile device. In step 212, an NLP analysis is executed with respect to the input question to extract a required value phrase. An output from NLP processing and/or analysis may be stored in a temporary integrated circuit based memory. Performing natural language processing (NLP) analysis on the input question may include an action such as, inter alia: performing part-of-speech (POS) tagging, performing parsing or syntactic analysis, performing phrase chunking, performing named entity recognition (NER), determining a typed dependency, etc.

In step 214, a mathematical equation is generated based on the extracted required value phrase. Generating the mathematical equation may include:

1. Identifying the location specific word or phrase comprised by the received input question. A value associated with the identified location specific word or phrase varies according to a particular geographical point. The identification process may include communicating online with the specialized remotely located database computer to access the online L-word Dictionary. Identifying the location specific word or phrase may include scanning the L-word Dictionary comprising a global list of generic or domain-specific location-sensitive words or phrases. The L-word Dictionary enables execution of a text list, a key-value pair, an XML value, or a database table in a data repository.

2. Resolving the identified location specific word or phrase comprised by the received input question. The resolving process may include communicating online with the specialized remotely located database computer to access the online L-word Dictionary and recursively mapping a plurality of variables associated with the location specific word or phrase to at least one formula contained in the L-word Dictionary.

In step 216, at least one interim question is formed based on the extracted required value phrase. In step 218, the formed mathematical equation and the at least one formed interim question are solved via specialized circuitry. The solving process includes prompting the user via the graphical user interface for a plurality of digital inputs to resolve an ambiguity associated with the formed mathematical equation and the at least one formed interim question. In step 220, the answer to the input question is determined in natural language based on the solved at least one interim question or the solved mathematical equation. Determining the answer may include the hardware device simultaneously interacting with a specialized on-line question-answer system to simultaneously search: an internet, a plurality of online data repositories, a plurality of online databases, and a plurality of online corpuses according to the value associated with the identified location specific word or phrase associated with the particular geographical point. In step 224, the answer to the input question is narrated in natural language based on the solved at least one interim question or solved mathematical equation. The narrated answer includes an automated interactive response from the hardware device in real time.

Figure 3:
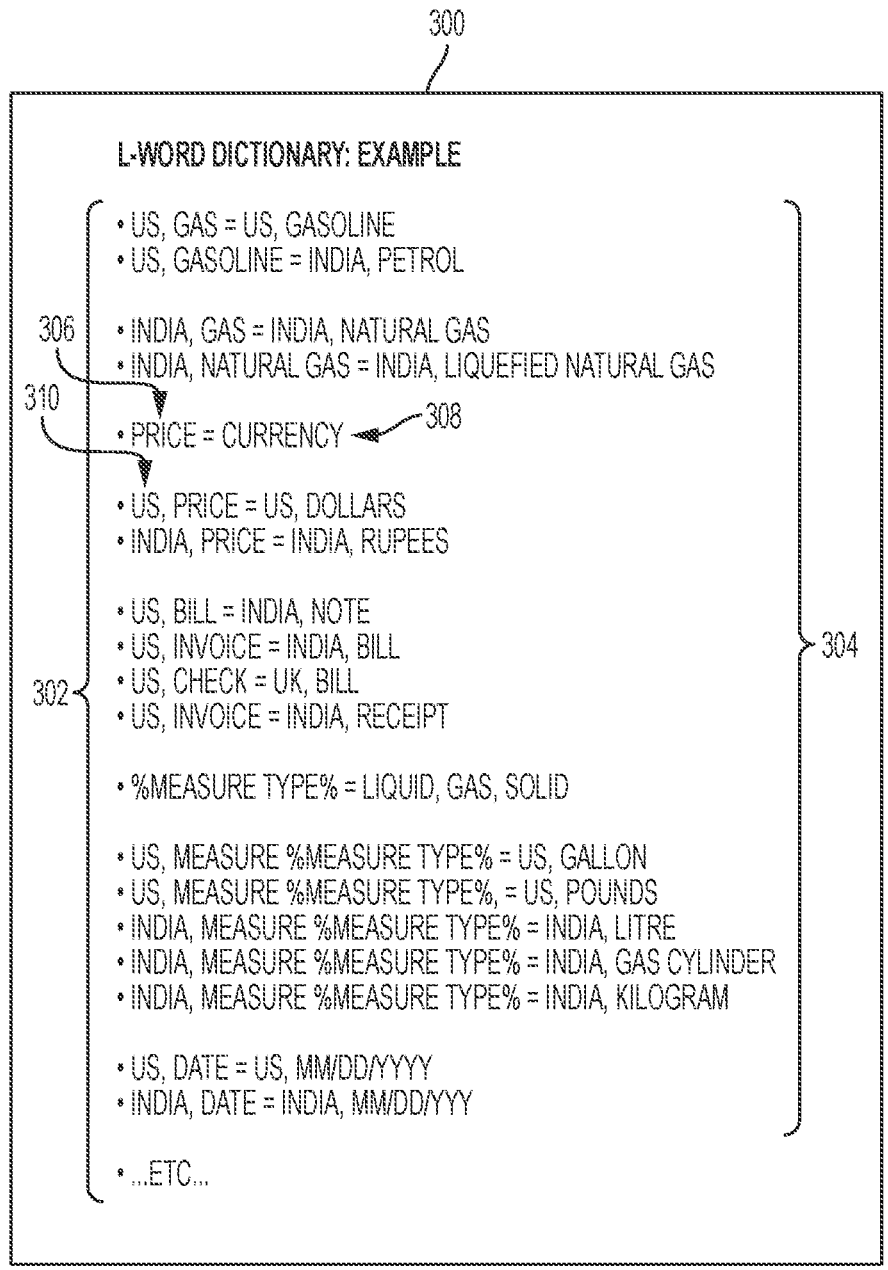
FIG. 3 illustrates an L-word dictionary comprising a set of L-Words associated possible corresponding values, in accordance with embodiments of the present invention.

FIG. 3 illustrates an L-word dictionary 300 comprising a set of L-words associated possible corresponding values, in accordance with embodiments of the present invention. L-word dictionary 300 may include an L-word Dictionary 27 (of FIG. 1) comprising a set of L-Words 302 and possible corresponding values 304. L-words 302 may be defined as location-sensitive words or phrases whose values 304 depend on and may vary by location (e.g., US gas). L-Words 302 may be generic, domain independent, or domain-specific. Furthermore, the value 304 corresponding to an L-word 302 may be another L-Word 302, or could be a formula or equation composed of other L-words 302 or concepts (e.g., date format dd/mm/yyyy). Additionally, an L-word value 304 could be definitive (synonym, concept, attribute, category or fact about an entity or event). For example, US, gasoline=India, petrol or US, check=UK, bill] or variable (represented through a notation such as % object %). Additionally, variables may be resolved to another L-Word 302 entry contained within the L-Word Dictionary 27 (e.g., for the L-Word 302 "price" 206, the value 304 is a variable 308 currency) which may be resolved to another L-Word 302 "US" 310 within the L-Word Dictionary 27.

Variable resolution (e.g., a process for resolving a variable) may comprise performing a recursive process retrieve until all variables are resolved, and the resolution may be context dependent (e.g., if % measure type %=liquid then US, measure % measure type %=US, gallon). Furthermore, the L-word Dictionary 27 may be generic, domain independent, or domain specific. Additionally, the L-Word Dictionary 114 may comprise definitive values 304, or variables, or formulas or equations containing variables as previously described. According to the present embodiment, the construct of an L-word dictionary 114 may be flexible. L-word Dictionary 27 may be defined and implemented via any acceptable and technically feasible mechanism, such as text list, key-value pair, XML, table in a data repository, etc.

Figure 4A:
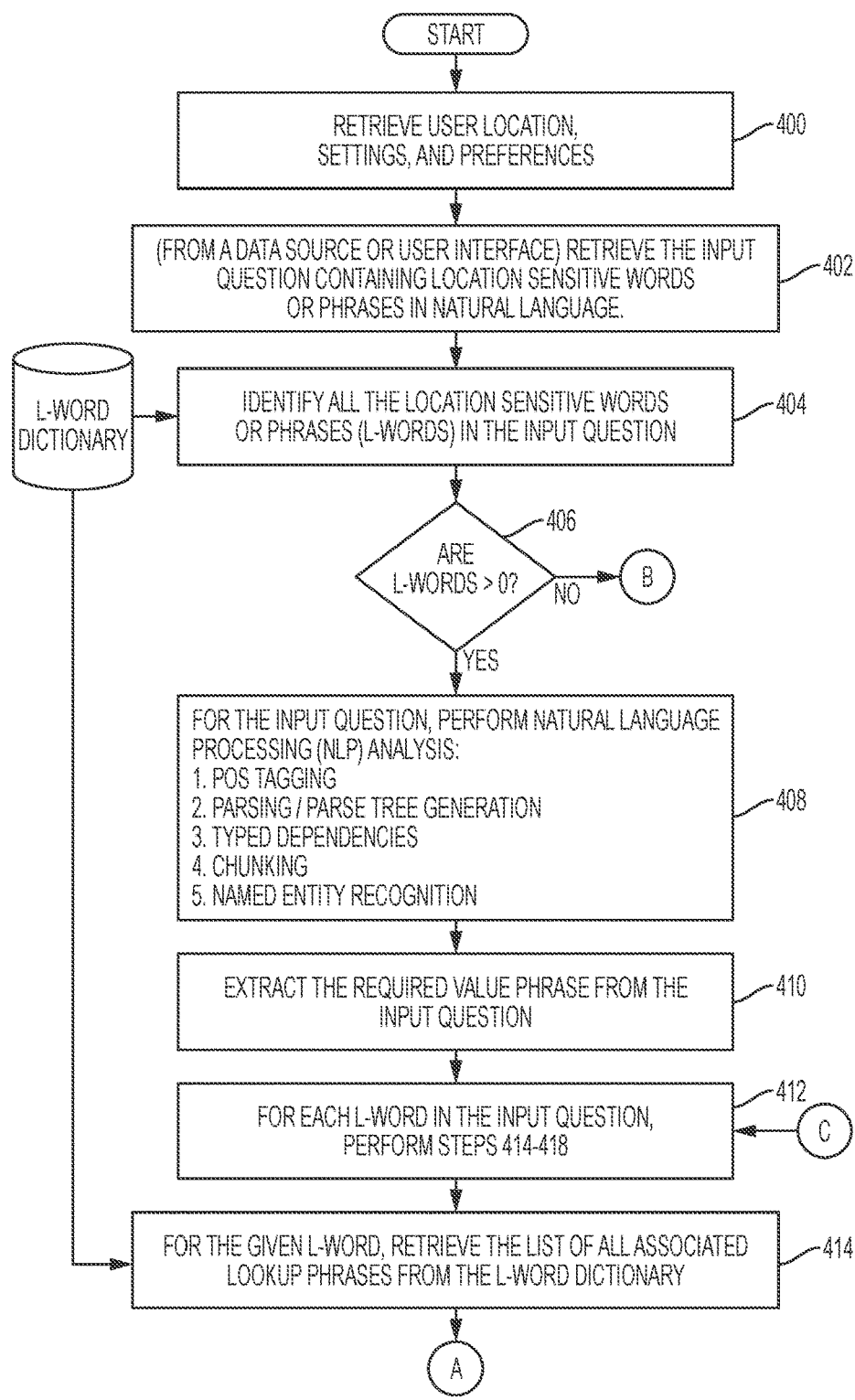
FIGS. 4A-4C, illustrates a detailed algorithm further detailing a process flow enabled by the system of FIG. 1 for generating an answer to an input question comprising location sensitive words or phrases, in accordance with embodiments of the present invention.
Figure 4B:
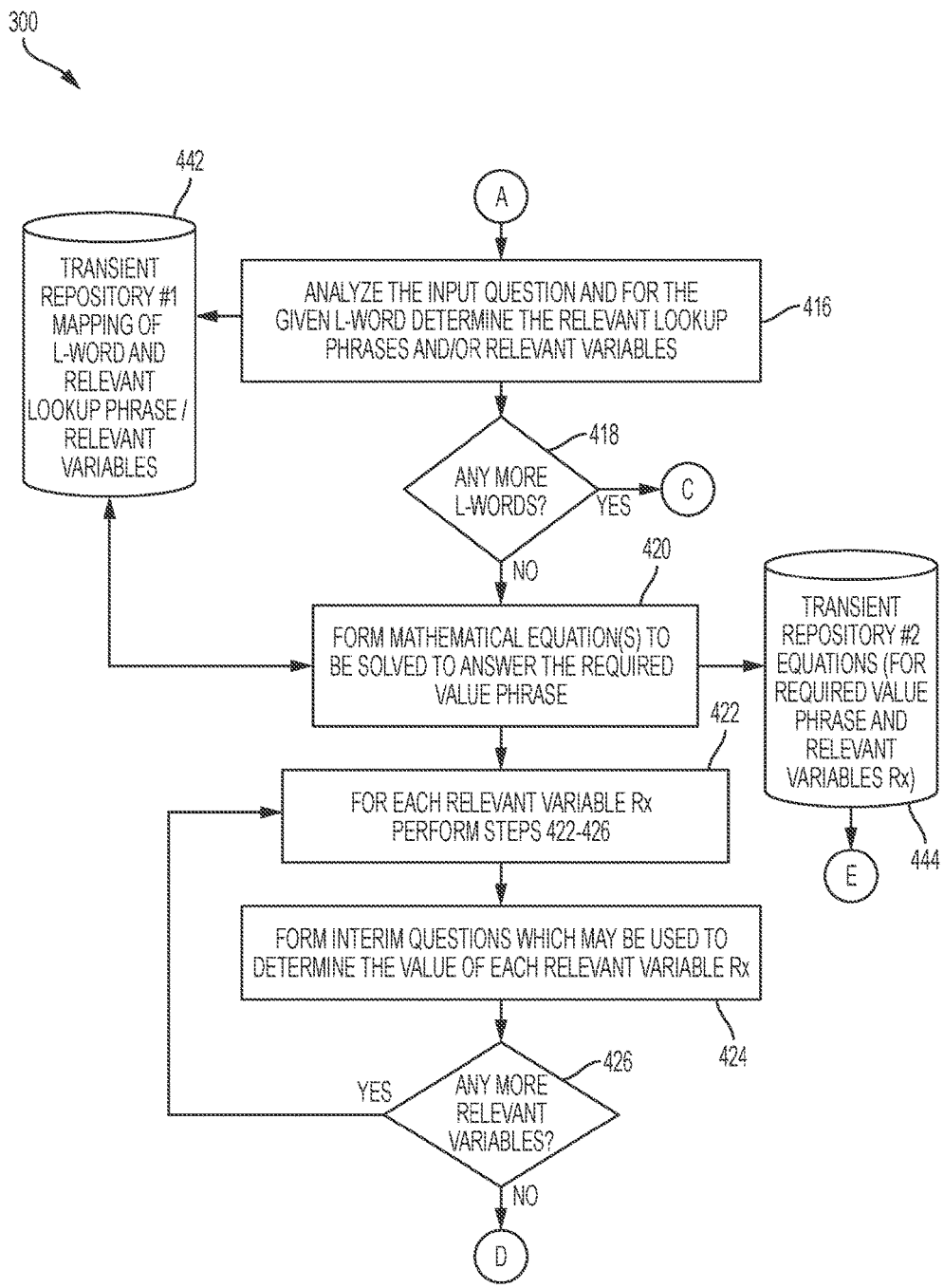
Figure 4C:
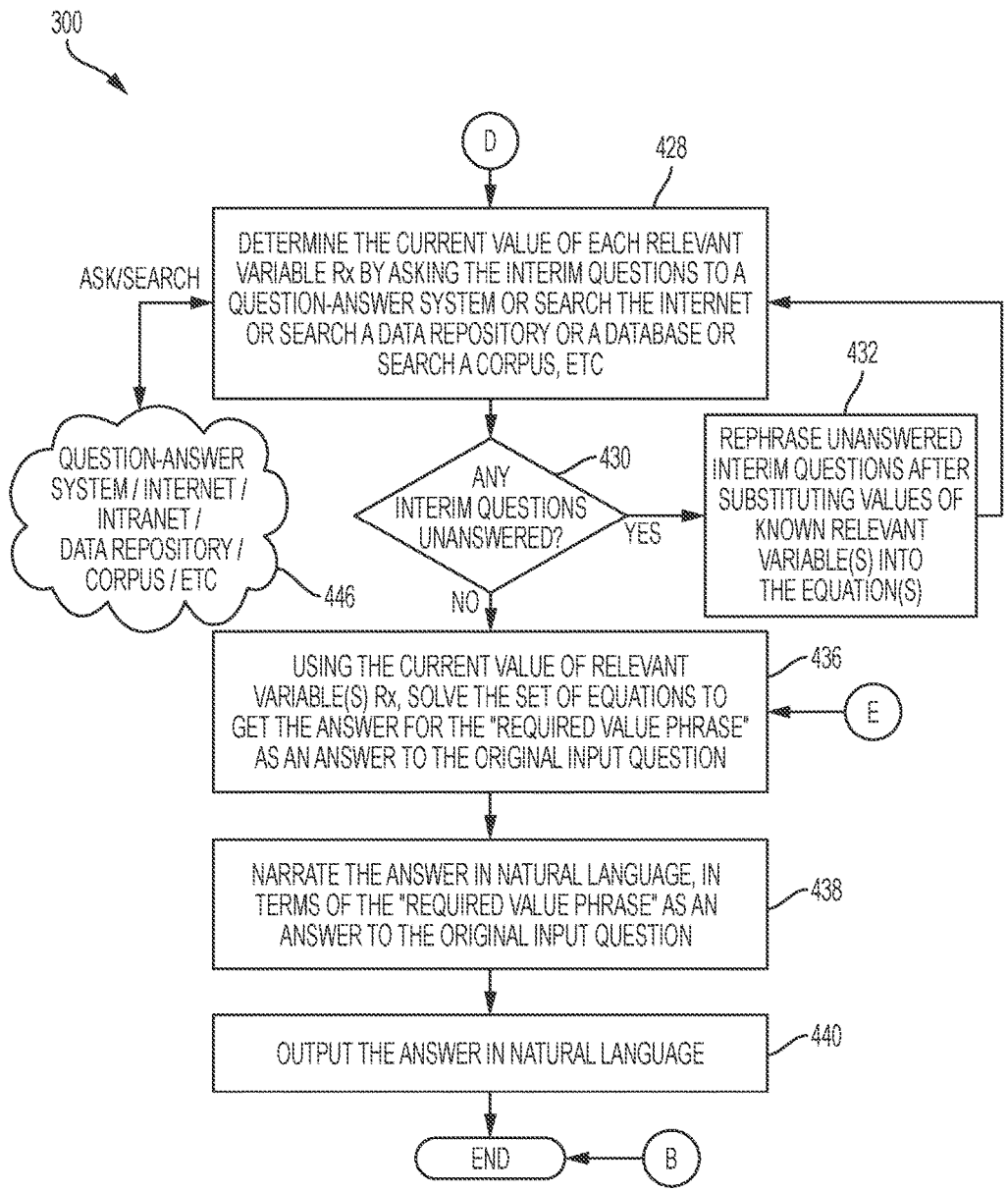

FIG. 4, including FIGS. 4A-4C, illustrates a detailed algorithm further detailing a process flow enabled by system 100 of FIG. 1 for generating an answer to an input question comprising location sensitive words or phrases, in accordance with embodiments of the present invention. In step 400, a user's current location, location settings, and location-specific preferences are retrieved. The user's current location may be retrieved via an IP address, a device GPS location, triangulation, etc. In step 402, an input question comprising location sensitive words or phrases is retrieved in natural language from a data source or user interface. In step 404, all location sensitive words or phrases (i.e., L-words) within the input question are identified. The location sensitive words or phrases (i.e., L-words) within the input question may be identified via usage of an L-word Dictionary 27 (i.e., as illustrated in FIG. 1). In step 406, it is determined if the input question is location sensitive and comprises any L-words (i.e., L-Words>0). If in step 406, it is determined that the input question is not location sensitive and does not comprise any L-words (i.e., L-Words=0), then the process is terminated. If in step 406, it is determined that the input question is location sensitive and does comprise L-Words (i.e., L-Words>0), then in step 408, a natural language processing (i.e., NLP) analysis is executed). For example, an NLP analysis process may comprise, inter alia, POS tagging, parsing or parse tree generation, typed dependencies, chunking, named entity recognition, etc. An output of the NLP analysis may be stored in a temporary repository or a hardware memory unit. In step 410, a required value phrase is extracted from the input question. A required value phrase is defined herein as a phrase or term in the input question that must be answered in order to answer the location sensitive question. For example, the method may extract a required value phrase, such as ("gas price") from the input question. In step 412, steps 414-418 (described in detail below) are iteratively executed with respect to each L-Word in the input question. In step 414, a list of all associated lookup phrases from the L-word Dictionary for the given L-word is retrieved. In step 416, the input question for a given L-word is analyzed and relevant lookup phrases and/or relevant variables from a transient repository 442 are determined. In step 418, it is determined if are any more L-words have been located. If in step 418, it is determined that more L-words have been located, then step 412 is repeated. If in step 418, it is determined that more L-words have not been located, then in step 420, mathematical equation(s) are formed and solved utilizing algorithms which may be implemented by methodology described in U.S. Pat. No. 9,495,355 which is incorporated herein in its entirety. The mathematical formulas are solved with respect to answering a required value phrase by referencing transient repository 444.

In step 422, steps 422-426 are iteratively executed for each relevant variable Rx. In step 424, interim questions are formed which may be used to determine a value for each relevant variable Rx. In step 426, it is determined if there are any more relevant variables. If in step 426, it is determined that there are more relevant variables then step 422 is repeated. If in step 426, it is determined that there are not any more relevant variables then in step 428, a current value for each relevant variable Rx is determined by presenting the interim questions formed in step 424 to a question answer (hardware) system by: searching the Internet 446; searching a data repository 446 or database 446 or searching a corpus 446, etc. In step 430, it is determined if any questions have not been answered. If in step 430 it is determined that all questions have been answered, then step 436 is executed as described, infra. If in step 430, it is determined that there are questions remaining unanswered, then in step 432 unanswered interim questions are rephrased after substituting values of known relevant variable(s) into the equations(s) and step 428 is repeated to determine a current value for each relevant variable Rx by presenting the interim questions to a question answer system by: searching the Internet 446; searching a data repository 446 or database 446 or searching a corpus 446, etc. In step 436, current values of relevant variable(s) Rx are used to solve a set of equations to retrieve an answer for the required value phrase as an answer to the original input question. In step 438, the answer is narrated in natural language, in terms of the required value Phrase, as an answer to the original question. In step 440, the answer is outputted in natural language.

FIGS. 5A-5D illustrate examples 500 for solving location sensitive questions using the algorithm of FIG. 4, in accordance with embodiments of the present invention. As such, the appropriate step 502 of the algorithm of FIG. 4 is depicted alongside example question columns 504-512. For example, with respect to FIG. 4A, step 400 in the flowchart comprises retrieving a user's current location (US with respect to column 504), location settings (US dollar and US units with respect to column 540), and location-specific preferences (no location preferred with respect to column 504). Step 402 in the algorithm specifies "Retrieve the input question containing time-sensitive words or phrases in natural language (from a data source or user interface). The example question in column 504 may comprise, "What is the gas price in Bangalore India". Step 404 in the flow chart specifies "Identify all the location sensitive words or phrases (L-words) in the input question". Therefore, with respect to the current example, the words "gas price, Bangalore, and India" may be extracted.

The previously described algorithm of FIG. 4 for answering location sensitive questions may derive the answers to the example questions depicted in FIGS. 5A-5D as follows:

Step 402 in algorithm (of FIGS. 4A-4C) comprises retrieving the input question comprising location sensitive words or phrases in natural language (from a data source or user interface). For example, the question of column 504 comprises: What is the gas price in Bangalore India? Step 404 in algorithm of FIGS. 4A-4C comprises identifying all the location sensitive words or phrases (L-Words) in the input question. For example, column 504 identifies the following: gas price, Bangalore, India. Step 406 in algorithm of FIGS. 4A-4C) recites: T-Words>0? and the answer in column 504 comprises yes. Therefore, step 408 in the algorithm indicates that for the input question, perform an NLP Analysis (POS tagging, parsing, parse tree generation, typed dependencies, chunking, named entity resolution, etc.). Step 410 in algorithm specifies: Extract the required value phrase (such as "gas price in Bangalore, India") in the input question. Steps 412-414 in algorithm specify: For each L-word, retrieve the list of all associated lookup phrases from the L-word dictionary. For example, in column 504: US, gas=US gasoline . . . India measure=India, liter. Step 416 in algorithm specifies: Analyze the input question and determine the list of relevant lookup phrases I relevant variables Rx. For example, in column 504: petrol price per liter in Bangalore, India. Step 420 in algorithm specifies: Form mathematical equation(s) to be solved to answer the required value phrase. For example, in column 504: 1 US gallon=3.78541 liter . . . Rupees. Step 424 in algorithm specifies: For each relevant variable Rx, form interim questions for determining value of each relevant variable equation(s) to be solved to answer the required value phrase. For example, in column 504: what is the petrol price per liter in Bangalore, India? Step 428 in algorithm specifies: Determine the current value of each relevant variable Rx by: asking the interim questions to a question answer system, searching the Internet, searching a data repository, database, or Corpus, etc. For example, in column 504: petrol price . . . March-2016. Step 430 in algorithm determines if any interim questions have not been answered. For example, in column 504: NO. Therefore, the remaining steps in column 504 are specified as <not applicable>.

Figure 6:
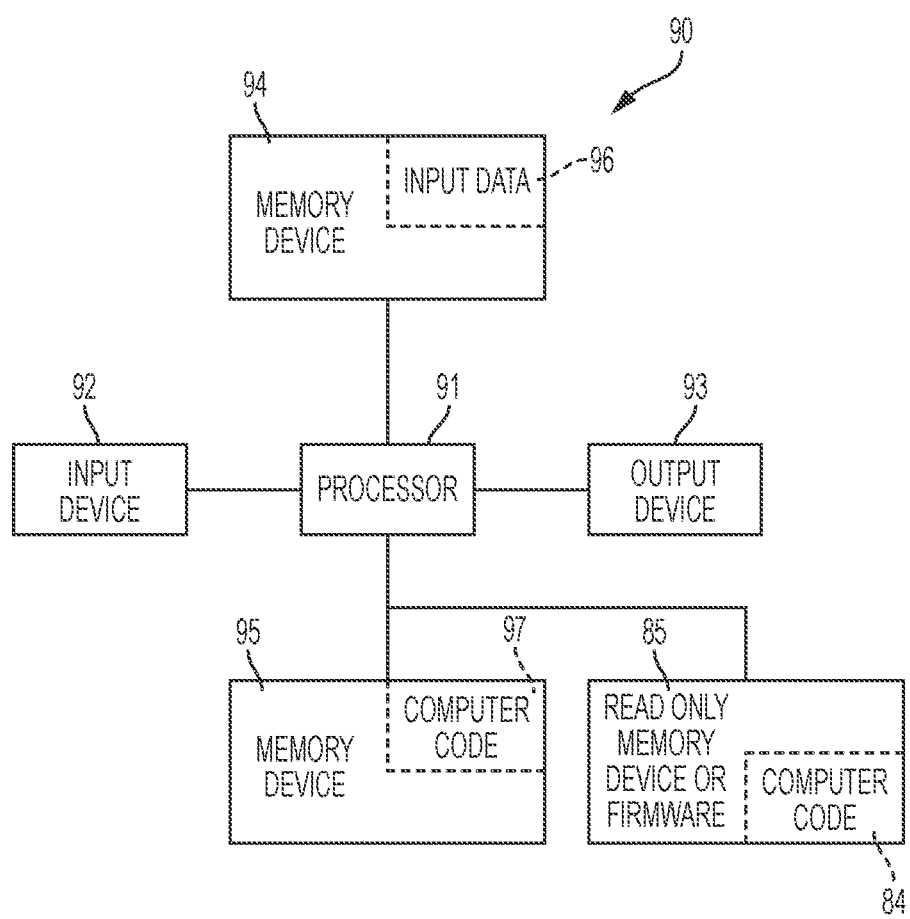
FIG. 6 illustrates a computer system used by the system of FIG. 1 for enabling a process for generating an answer to an input question comprising location sensitive words or phrases in real time using natural language processing (NLP), in accordance with embodiments of the present invention.

FIG. 6 illustrates a computer system 90 (e.g., hardware device 22 and hardware device 14) used by or comprised by the system of FIG. 1 for generating an answer to an input question comprising location sensitive words or phrases in real time using NLP, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 4) for enabling a process for generating an answer to an input question comprising location sensitive words or phrases in real time using NLP. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithms of FIGS. 2 and 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2 and 4) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for generating an answer to an input question comprising location sensitive words or phrases in real time using NLP. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for generating an answer to an input question comprising location sensitive words or phrases in real time using NLP. In another embodiment, the invention provides a business method that performs the process steps of the invention on a subscription, advertising, and/or fee basis. That is, a service supplier, such as a Solution Integrator, could offer to enable a process for generating an answer to an input question comprising location sensitive words or phrases in real time using NLP. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
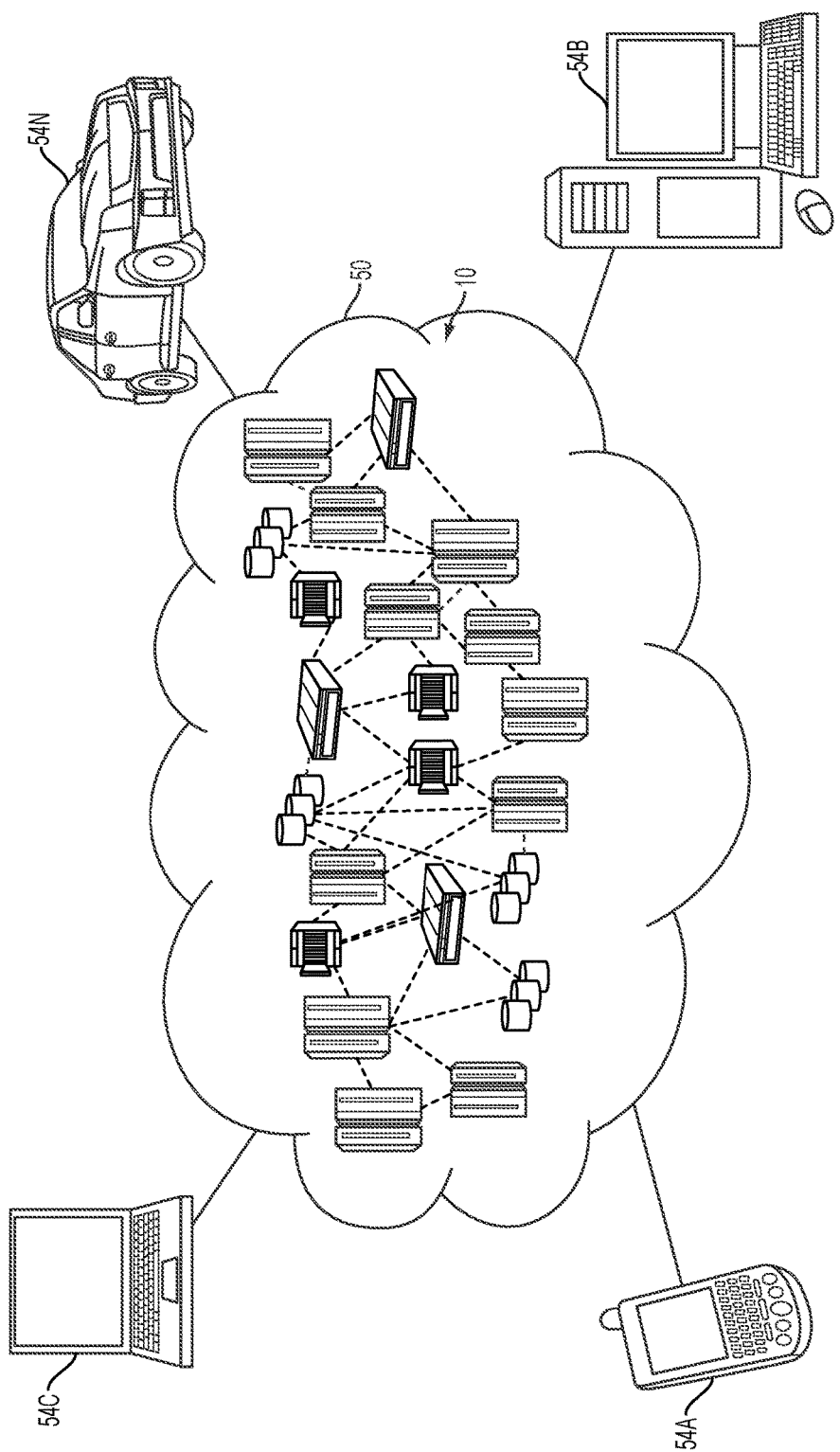
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
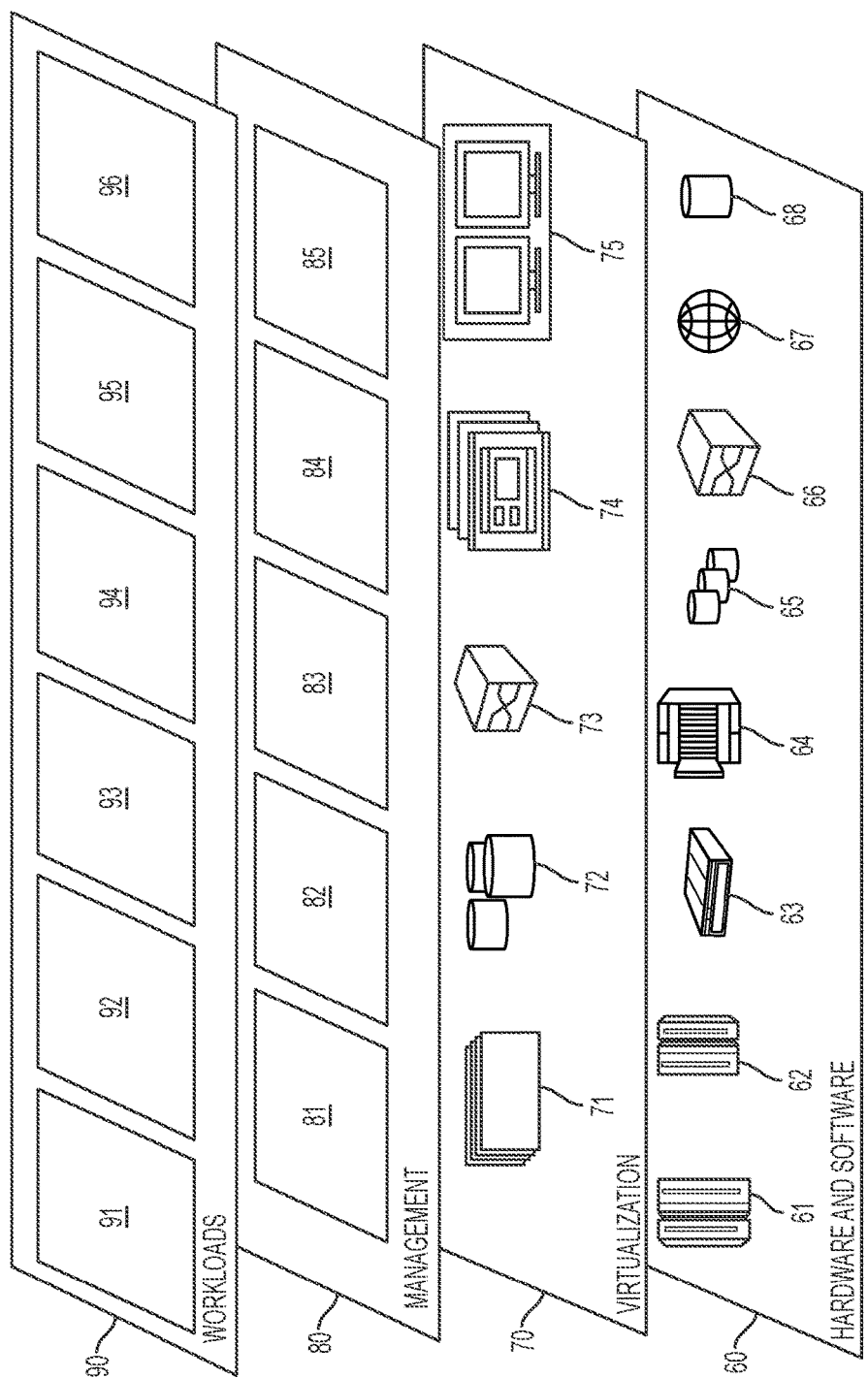
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating an answer to an input question comprising location sensitive words or phrases in real time using NLP 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated method for generating an answer to an input question comprising a location specific (L) word or phrase using natural language processing (NLP), said method comprising:

generating and maintaining, by a processor of a hardware device, an online L-word dictionary, wherein said generating and maintaining comprises:
    determining a relationship between a plurality of L-words and a plurality of corresponding values, wherein said plurality of corresponding values include a plurality of related lookup phrases and a plurality of concept terms;
    mapping said plurality of L-words to said plurality of corresponding values based on said determined relationship; and
    storing said mapped plurality of L-words to said plurality of corresponding values in said online L-word Dictionary comprised by a specialized remotely located database computer;
retrieving, by said processor via circuitry of a mobile device of a user, location specific attributes associated with a current location of said mobile device and said user;
retrieving, by said processor, location specific settings and location specific preferences associated with said user;
receiving, by said processor, said input question, wherein said input question is entered by said user via a graphical user interface associated with said mobile device;
executing, by said processor, an NLP analysis with respect to said input question to extract a required value phrase;
generating, by said processor, at least one mathematical equation based on the extracted required value phrase, wherein said generating said at least one mathematical equation comprises:
    identifying said location specific word or phrase comprised by said received input question, wherein a value associated with said identified location specific word or phrase varies according to a particular geographical point, and wherein said identifying comprises communicating online with said specialized remotely located database computer to access said online L-word Dictionary; and
    resolving said identified location specific word or phrase comprised by said received input question, wherein said resolving comprises said communicating online with said specialized remotely located database computer to access said online L-Word Dictionary and recursively mapping a plurality of variables associated with said location specific word or phrase to at least one formula contained in said L-Word Dictionary; forming, by said processor, at least one interim question based on said extracted required value phrase;

solving, by said processor executing specialized circuitry, said at least one formed mathematical equation and the at least one formed interim question, wherein said solving comprises prompting said user via said graphical user interface for a plurality of digital input to resolve an ambiguity associated with said at least one formed mathematical equation and said at least one formed interim question;

determining, by said processor, said answer to said input question in natural language based on said solved at least one interim question or said solved at least one mathematical equation, wherein said determining said answer comprises said hardware device simultaneously interacting with a specialized on-line question-answer system to simultaneously search: an internet, a plurality of online data repositories, a plurality of online databases, and a plurality of online corpuses according to said value associated with said identified location specific word or phrase associated with said particular geographical point; and narrating, by said processor, said answer to said input question in natural language based on said solved at least one interim question or said solved at least one mathematical equation, wherein said narrated answer comprises an automated interactive response from said hardware device in real time.

2. The method of claim 1, wherein said retrieving said location specific attributes comprises:
identifying an IP address of said mobile device;
determining a network in communication with said IP address; and
determining said current location based on based on a location of said network.

3. The method of claim 1, wherein said retrieving said location specific attributes comprises:
identifying an GPS coordinates of said mobile device; and
determining said current location based on based on said GPS coordinates.

4. The method of claim 1 further comprising:
determining at least one relevant variable based on said extracted required value phrase; and
determining at least one current value for said at least one determined relevant variable.

5. The method of claim 1, wherein said identifying said location specific word or phrase comprises scanning said L-word Dictionary comprising a global list of generic or domain-specific location-sensitive words or phrases.

6. The method of claim 5, wherein said L-word Dictionary enables execution of a text list, a key-value pair, an XML value, or a database table in a data repository.

7. The method of claim 1, wherein an output from said natural language processing (NLP) is stored in a temporary integrated circuit based memory.

8. The method of claim 1, wherein performing natural language processing (NLP) analysis on the input question comprises an action selected form the group consisting of: performing part-of-speech (POS) tagging, performing parsing or syntactic analysis, performing phrase chunking, performing named entity recognition (NER); and determining a typed dependency.

9. The method of claim 1, further comprising:
providing at least one support service for at least one of creating, integrating, hosting, maintaining, and deploying computer-readable code in the hardware device, said code being executed by the computer processor to implement: said generating and maintaining, said retrieving said location specific attributes, said retrieving said location specific settings, said receiving, said executing, said generating, said forming, said solving, said determining, and said narrating.

10. A computer program product, comprising a computer readable hardware storage device storing a computer readable program code, said computer readable program code comprising an algorithm that when executed by a processor of a hardware device implements an automated method for generating an answer to an input question comprising a location specific (L) word or phrase using NLP, said method comprising:

generating and maintaining, by said processor, an online L-word dictionary, wherein said generating and maintaining comprises:
determining a relationship between a plurality of L-words and a plurality of corresponding values, wherein said plurality of corresponding values include a plurality of related lookup phrases and a plurality of concept terms;
mapping said plurality of L-words to said plurality of corresponding values based on said determined relationship; and
storing said mapped plurality of L-words to said plurality of corresponding values in said online L-word Dictionary comprised by a specialized remotely located database computer;

retrieving, by said processor via circuitry of a mobile device of a user, location specific attributes associated with a current location of said mobile device and said user;

retrieving, by said processor, location specific settings and location specific preferences associated with said user;

receiving, by said processor, said input question, wherein said input question is entered by said user via a graphical user interface associated with said mobile device;

executing, by said processor, an NLP analysis with respect to said input question to extract a required value phrase;

generating, by said processor, at least one mathematical equation based on the extracted required value phrase, wherein said generating said at least one mathematical equation comprises:
identifying said location specific word or phrase comprised by said received input question, wherein a value associated with said identified location specific word or phrase varies according to a particular geographical point, and wherein said identifying comprises communicating online with said specialized remotely located database computer to access said online L-word Dictionary; and
resolving said identified location specific word or phrase comprised by said received input question, wherein said resolving comprises said communicating online with said specialized remotely located database computer to access said online L-Word Dictionary and recursively mapping a plurality of variables associated with said location specific word or phrase to at least one formula contained in said L-Word Dictionary; forming, by said processor, at least one interim question based on said extracted required value phrase;

solving, by said processor executing specialized circuitry, said at least one formed mathematical equation and the at least one formed interim question, wherein said solving comprises prompting said user via said graphical user interface for a plurality of digital input to resolve an ambiguity associated with said at least one formed mathematical equation and said at least one formed interim question;

determining, by said processor, said answer to said input question in natural language based on said solved at least one interim question or said solved at least one mathematical equation, wherein said determining said answer comprises said hardware device simultaneously interacting with a specialized on-line question-answer system to simultaneously search: an internet, a plurality of online data repositories, a plurality of online databases, and a plurality of online corpuses according to said value associated with said identified location specific word or phrase associated with said particular geographical point; and narrating, by said processor, said answer to said input question in natural language based on said solved at least one interim question or said solved at least one mathematical equation, wherein said narrated answer comprises an automated interactive response from said hardware device in real time.

11. The computer program product of claim 10, wherein said retrieving said location specific attributes comprises:
identifying an IP address of said mobile device;
determining a network in communication with said IP address; and
determining said current location based on based on a location of said network.

12. The computer program product of claim 10, wherein said retrieving said location specific attributes comprises:
identifying an GPS coordinates of said mobile device; and
determining said current location based on based on said GPS coordinates.

13. The computer program product of claim 10, wherein said method further comprises:
determining at least one relevant variable based on said extracted required value phrase; and
determining at least one current value for said at least one determined relevant variable.

14. The computer program product of claim 10, wherein said identifying said location specific word or phrase comprises scanning said L-word Dictionary comprising a global list of generic or domain-specific location-sensitive words or phrases.

15. The computer program product of claim 14, wherein said L-word Dictionary enables execution of a text list, a key-value pair, an XML value, or a database table in a data repository.

16. The computer program product of claim 10, wherein an output from said natural language processing (NLP) is stored in a temporary integrated circuit based memory.

17. The computer program product of claim 10, wherein performing natural language processing (NLP) analysis on the input question comprises an action selected form the group consisting of: performing part-of-speech (POS) tagging, performing parsing or syntactic analysis, performing phrase chunking, performing named entity recognition (NER); and determining a typed dependency.

18. A hardware device comprising a processor coupled to a computer-readable memory unit, said memory unit comprising instructions that when executed by the processor implements an automated method for generating an answer to an input question comprising a location specific (L) word or phrase using NLP, said method comprising:
generating and maintaining, by a processor of a hardware device, an online L-word dictionary, wherein said generating and maintaining comprises:

determining a relationship between a plurality of L-words and a plurality of corresponding values, wherein said plurality of corresponding values include a plurality of related lookup phrases and a plurality of concept terms;

mapping said plurality of L-words to said plurality of corresponding values based on said determined relationship; and storing said mapped plurality of L-words to said plurality of corresponding values in said online L-word Dictionary comprised by a specialized remotely located database computer;

retrieving, by said processor via circuitry of a mobile device of a user, location specific attributes associated with a current location of said mobile device and said user;

retrieving, by said processor, location specific settings and location specific preferences associated with said user;

receiving, by said processor, said input question, wherein said input question is entered by said user via a graphical user interface associated with said mobile device;

executing, by said processor, an NLP analysis with respect to said input question to extract a required value phrase;

generating, by said processor, at least one mathematical equation based on the extracted required value phrase, wherein said generating said at least one mathematical equation comprises:

identifying said location specific word or phrase comprised by said received input question, wherein a value associated with said identified location specific word or phrase varies according to a particular geographical point, and wherein said identifying comprises communicating online with said specialized remotely located database computer to access said online L-word Dictionary; and resolving said identified location specific word or phrase comprised by said received input question, wherein said resolving comprises said communicating online with said specialized remotely located database computer to access said online L-Word Dictionary and recursively mapping a plurality of variables associated with said location specific word or phrase to at least one formula contained in said L-Word Dictionary; forming, by said processor, at least one interim question based on said extracted required value phrase;

solving, by said processor executing specialized circuitry, said at least one formed mathematical equation and the at least one formed interim question, wherein said solving comprises prompting said user via said graphical user interface for a plurality of digital input to resolve an ambiguity associated with said at least one formed mathematical equation and said at least one formed interim question;

determining, by said processor, said answer to said input question in natural language based on said solved at least one interim question or said solved at least one mathematical equation, wherein said determining said answer comprises said hardware device simultaneously interacting with a specialized on-line question-answer system to simultaneously search: an internet, a plurality of online data repositories, a plurality of online databases, and a plurality of online corpuses according to said value associated with said identified location specific word or phrase associated with said particular geographical point; and narrating, by said processor, said answer to said input question in natural language based on said solved at least one interim question or said solved at least one mathematical equation, wherein said narrated answer comprises an automated interactive response from said hardware device in real time.

19. The hardware device of claim 18, wherein said retrieving said location specific attributes comprises:
   identifying an IP address of said mobile device;
   determining a network in communication with said IP address; and
   determining said current location based on based on a location of said network.

20. The hardware device of claim 18, wherein said retrieving said location specific attributes comprises:
   identifying an GPS coordinates of said mobile device; and
   determining said current location based on based on said GPS coordinates.

\* \* \* \* \*